United States Patent
Son

(10) Patent No.: US 12,052,563 B2
(45) Date of Patent: Jul. 30, 2024

(54) SYSTEM FOR DATA COMMUNICATION USING VEHICLE CAMERA, METHOD THEREFOR AND VEHICLE FOR THE SAME

(71) Applicant: HYUNDAI MOBIS Co., Ltd., Seoul (KR)

(72) Inventor: Ji Yeon Son, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 57 days.

(21) Appl. No.: 17/970,981

(22) Filed: Oct. 21, 2022

(65) Prior Publication Data

US 2023/0137349 A1 May 4, 2023

(30) Foreign Application Priority Data

Nov. 1, 2021 (KR) ........................ 10-2021-0147686

(51) Int. Cl.
*G06V 20/58* (2022.01)
*G08G 1/01* (2006.01)
(Continued)

(52) U.S. Cl.
CPC .......... *H04W 12/037* (2021.01); *G06V 20/58* (2022.01); *G08G 1/0112* (2013.01); *G08G 1/0175* (2013.01); *H04N 23/61* (2023.01); *H04N 23/695* (2023.01); *H04N 23/90* (2023.01); *H04W 4/40* (2018.02); *G07C 5/008* (2013.01)

(58) Field of Classification Search
None
See application file for complete search history.

(56) References Cited

U.S. PATENT DOCUMENTS

2017/0019385 A1* 1/2017 Yoo ........................ H04L 63/062
2019/0140850 A1 5/2019 Ambrosin et al.
(Continued)

FOREIGN PATENT DOCUMENTS

| KR | 10-2014-0030691 A | 3/2014 |
| KR | 10-2020-0133853 A | 12/2020 |
| WO | 2021-146891 A1 | 7/2021 |

OTHER PUBLICATIONS

European Extended Search Report issued in corresponding European Patent Application No. 22200895.5 dated Jun. 1, 2023.
(Continued)

*Primary Examiner* — John F Mortell
(74) *Attorney, Agent, or Firm* — MORGAN, LEWIS & BOCKIUS LLP

(57) ABSTRACT

The present disclosure relates to a data communication system using a vehicle camera and data communication method using the same. A data communication system according to one embodiment of the present disclosure includes a vehicle having a camera sensor and a server transmitting and receiving data to and from the vehicle, the vehicle includes a processor extracting vehicle identification information from an image captured by the camera sensor, and the vehicle transmits the vehicle identification information to the server. According to embodiments of the present disclosure, since vehicle identification information can be collected and analyzed, useful traffic information may be secured and a driver driving assistance function and an autonomous driving function of a vehicle can be improved.

11 Claims, 9 Drawing Sheets

(51) Int. Cl.
   *G08G 1/017* (2006.01)
   *H04N 23/61* (2023.01)
   *H04N 23/695* (2023.01)
   *H04N 23/90* (2023.01)
   *H04W 4/40* (2018.01)
   *H04W 12/037* (2021.01)
   *G07C 5/00* (2006.01)

(56) References Cited

U.S. PATENT DOCUMENTS

2020/0312004 A1* 10/2020 Han ................... G06T 13/60
   2020/0351631 A1   11/2020 Neely et al.
   2021/0103740 A1*  4/2021 Yang .................. G08G 1/127
   2021/0221389 A1   7/2021 Long et al.

OTHER PUBLICATIONS

European Search Report issued in corresponding European Application No. 22200895.5 dated Mar. 9, 2023.

* cited by examiner

US 12,052,563 B2

SYSTEM FOR DATA COMMUNICATION USING VEHICLE CAMERA, METHOD THEREFOR AND VEHICLE FOR THE SAME

Pursuant to 35 U.S.C. § 119(a), this application claims the benefit of earlier filing date and right of priority to Korean Application No. 10-2021-0147686, filed on Nov. 1, 2021, the contents of which are hereby incorporated by reference herein in their entirety.

BACKGROUND OF THE DISCLOSURE

Field of the Disclosure

The present disclosure relates to a data communication system applicable to vehicles in all fields, and more particularly, a system for collecting data related to an image captured by a vehicle camera and performing transmission and reception by Vehicle-to-Everything (V2X) based communication.

Discussion of the Related Art

V2X communication is a technology that transmits and receives data over a wired or wireless network centered on a vehicle, and is used to refer to communication between a vehicle and all other objects, including vehicle-to-vehicle (V2V) communication and vehicle-to-infrastructure (V2I) communication.

The vehicle-to-vehicle (V2V) communication means communication of information between a vehicle and a vehicle, and may share position and speed information and the like with each other. Accordingly, a vehicle may assist the driving of a driver by using such information and may be used for various purposes such as preventing a traffic accident, etc. For example, when a V2V communication device is linked to a braking device and a control system of a vehicle, the vehicle may automatically brake in an emergency or provide a warning alarm to a driver.

The vehicle-to-infrastructure (V2I) communication is a vehicle communication technology by communication between a vehicle and a roadside infrastructure, and the vehicle may receive traffic information or safety support services from the infrastructure. In addition, the vehicle may transmit and receive various driving environment information from the outside through vehicle-centered communication such as vehicle-to-mobile terminal (V2P) communication, vehicle-to-network (V2N) communication, etc. and use such information to increase driving convenience and reduce accident risk.

Namely, through V2X communication, a vehicle may transmit and receive informations on various traffic environments (e.g., dark fog, slope, traffic accident, etc.) that are difficult to detect by built-in sensors. These informations may be used not only to improve mobility performance of the vehicle itself, but also to efficiently manage a road traffic network, and for various other purposes.

For example, Published Korean Patent No. 10-2014-0030691 ("Automatic Black Box Image Transmission Device and Method using V2X Communication") discloses a technology of protecting image data by transmitting images of a black box to a neighboring base station in case of a vehicle accident risk. Even if the black box image is damaged by the impact of a traffic accident, image data is transmitted to an external storage immediately before the accident to preserve image information about a traffic accident situation. Therefore, using this, it is possible to analyze the cause of the traffic accident and the issue of where the responsibility for the accident lies.

In addition to the above, the vehicle's V2X-based communication technology has a wide variety of applicable fields, and there is a need for technology improvement to utilize it for new purposes and usages.

SUMMARY OF THE DISCLOSURE

Accordingly, embodiments of the present disclosure are directed to a data communication system that substantially obviates one or more problems due to limitations and disadvantages of the related art.

One object of the present disclosure is to provide a system that transmits and receives vehicle identification information from an image obtained by a vehicle camera based on V2X.

Another object of the present disclosure is to provide a system that transmits and receives vehicle identification information efficiently by redundant data processing.

Further object of the present disclosure is to provide a system having improved data reliability and communication security by safely transmitting/receiving vehicle identification information.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages, according to one technical aspect of the present disclosure, a system for data communication includes a vehicle having a camera sensor and a server transmitting and receiving data to and from the vehicle. The vehicle comprises a processor extracting vehicle identification information from an image captured by the camera sensor. The vehicle transmits the vehicle identification information to the server.

Preferably, the vehicle further includes a communication unit for transmitting and receiving the data to and from the server and the communication unit communicates with the server based on V2X.

Preferably, the vehicle further includes a storage for storing the vehicle identification information, the camera sensor includes a front camera sensor photographing a view in a front direction of the vehicle and a side camera sensor photographing a view in a side direction of the vehicle, and the camera sensor may adjust a view angle.

According to another technical aspect of the present disclosure, a method for data communication includes obtaining vehicle identification information from an image captured by a camera sensor of a vehicle, releasing security of a server to communicate with the server by a communication unit of the vehicle based on V2X, and transmitting the vehicle identification information to the server from the communication unit.

Preferably, the releasing the security includes requesting seed information from the communication unit to the server and transmitting a key value from the communication unit to the server.

According to a further technical aspect of the present disclosure, a method for data communication using a data communication system includes receiving, by the vehicle, the vehicle identification information on a specific vehicle from the server, checking, by the vehicle, whether the vehicle identification information of the specific vehicle is stored in the storage, and transmitting, by the vehicle, the vehicle identification information on the specific vehicle and information related to the vehicle identification information to the server in response to a result checked in the checking step.

According to another further technical aspect of the present disclosure, a method for data communication using a data communication system includes obtaining vehicle identification information from the image captured by the camera sensor of the vehicle, releasing security of the server to communicate with the server by a communication unit of the vehicle based on V2X, and transmitting the vehicle identification information to the server from the communication unit. The obtaining the vehicle identification information includes adjusting the view angle of the camera sensor in consideration of whether a different vehicle is travelling in the side direction of the vehicle.

Accordingly, the present disclosure provides various effects and/or advantages.

According to embodiments of the present disclosure, a system for transmitting and receiving vehicle identification information obtained from an image acquired by a vehicle camera based on V2X may be provided.

According to embodiments of the present disclosure, a system capable of transmitting and receiving vehicle identification information safely and efficiently may be provided.

According to embodiments of the present disclosure, various direct and indirect effects may be obtained via vehicle identification information collection such as tracking of a specific vehicle and the like as well as driving assistance using vehicle identification information.

Effects obtainable from the present disclosure may be non-limited by the above-mentioned effect. And, other unmentioned effects can be clearly understood from the following description by those having ordinary skill in the technical field to which the present disclosure pertains. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings.

DETAILED DESCRIPTION OF THE DISCLOSURE

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

Figure 1:
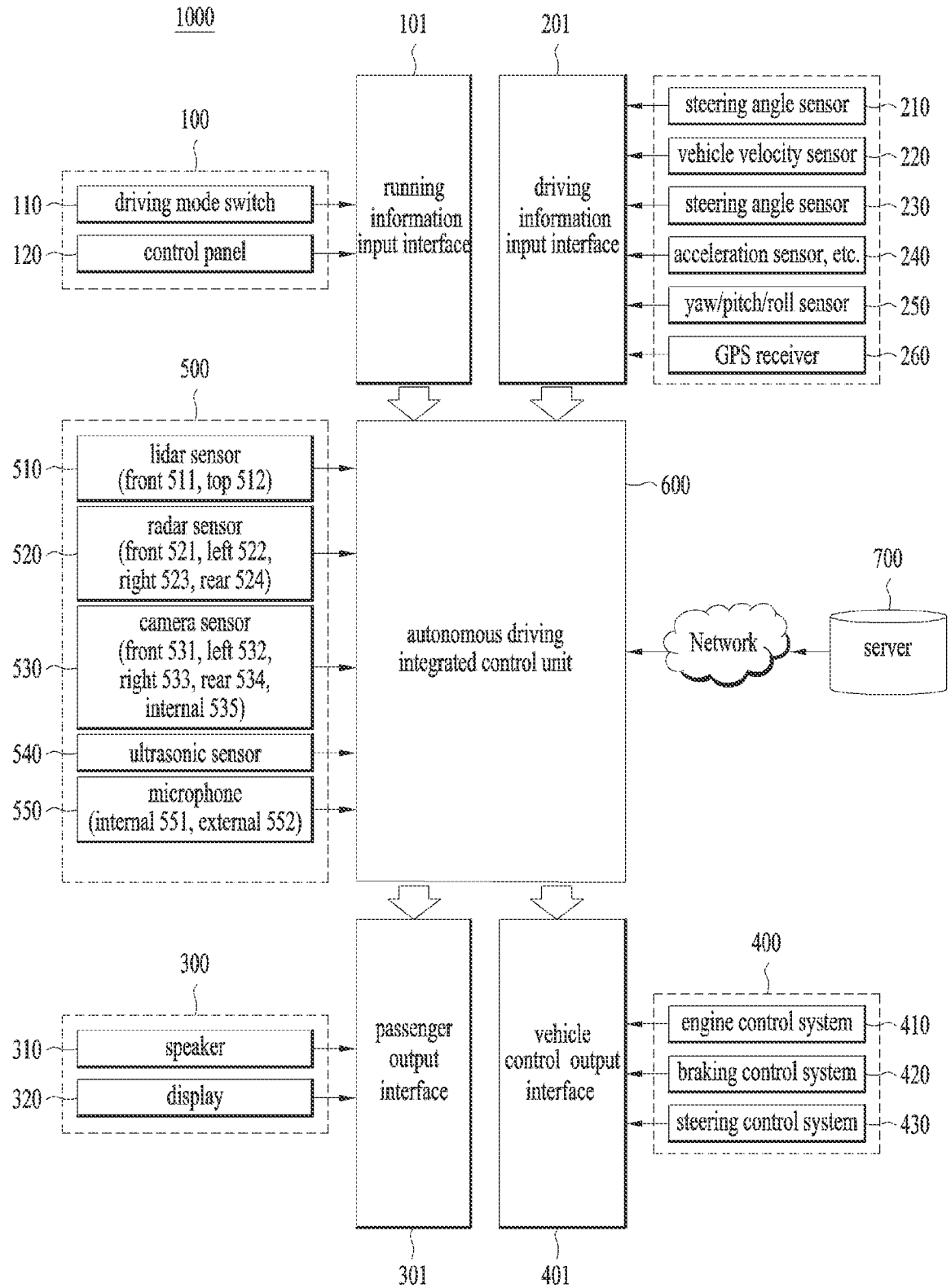
FIG. 1 is an overall block diagram of a vehicle system configuring a data communication system according to one of embodiments of the present disclosure.
Figure 2:
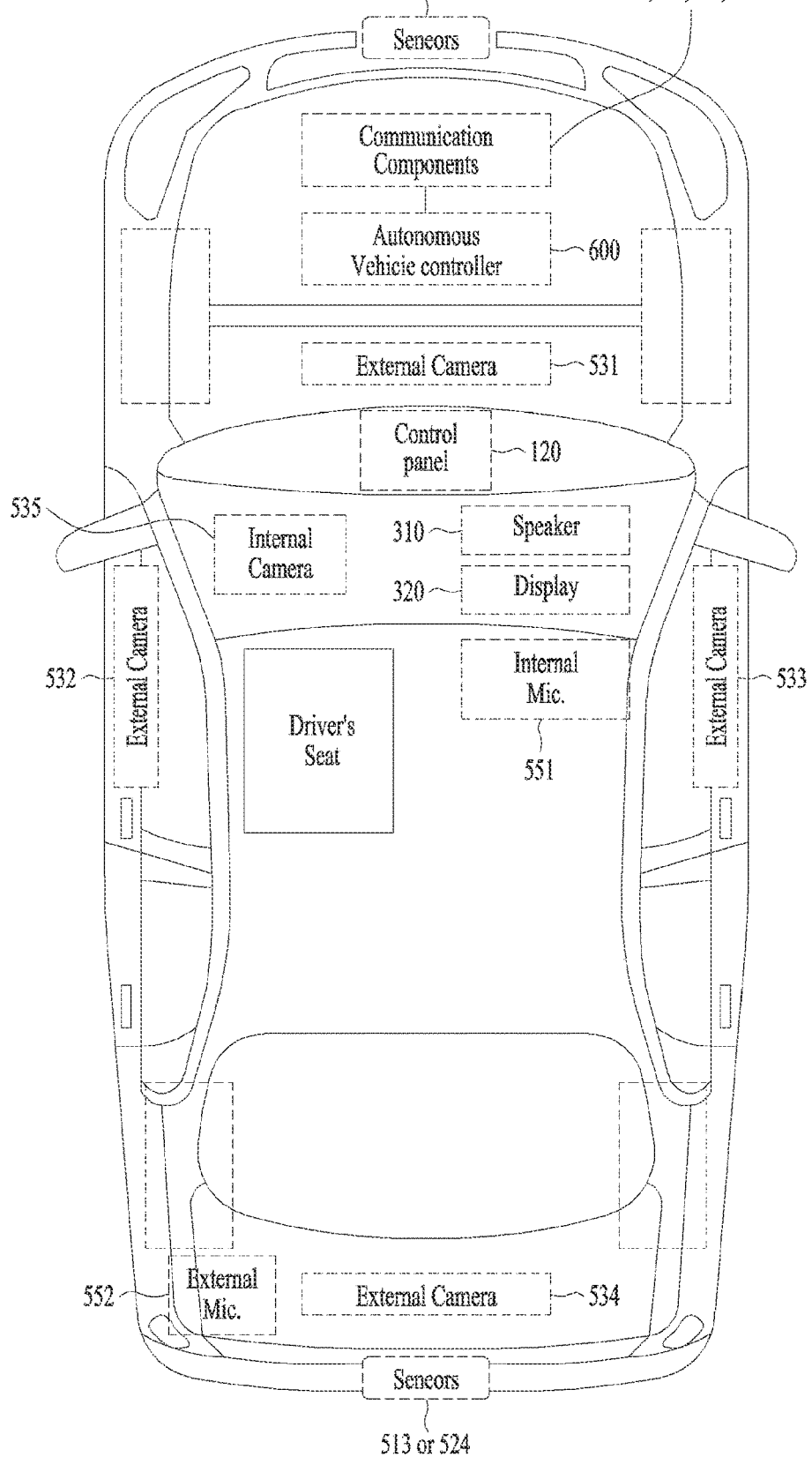
FIG. 2 illustrates a vehicle to which a data communication system according to one of embodiments of the present disclosure is applicable.

FIG. 1 is an overall block diagram of a vehicle system configuring a data communication system according to one of embodiments of the present disclosure. FIG. 2 illustrates a vehicle to which a data communication system according to one of embodiments of the present disclosure is applicable;

First, a structure and a function of a vehicle to which a system according to the present embodiments is applicable will be described with reference to FIG. 1 and FIG. 2.

As shown in FIG. 1, a vehicle 1000 may be implemented centering on a driving integrated control unit 600 that transmits and receives data necessary for a vehicle's driving control through an operating information input interface 101, a driving information input interface 201, and a passenger output interface 301. Yet, the driving integrated control unit 600 may be referred to as a controller or a processor, or may be simply referred to as a control unit in the present specification.

The driving integrated control unit 600 may obtain operating information according to a passenger's manipulation of a user input unit 100 in an autonomous driving mode or a manual driving mode of the vehicle through the operating information input interface 101. As shown in FIG. 1, the user input unit 100 may include a driving mode switch 110 and a control panel 120 (e.g., a navigation terminal mounted on a vehicle, a smartphone or a tablet PC owned by a passenger, etc.), and thus the operating information may include driving mode information and navigation information of the vehicle.

For example, a vehicle's driving mode (i.e., an autonomous/manual driving mode or a sports/echo/safety/normal mode) determined by a passenger's manipulation of the driving mode switch 110 may be transmitted as the above-described operating information to the driving integrated control unit 600 through the operating information input interface 101.

In addition, navigation information such as a passenger's destination inputted by a passenger through the control panel 120 and a route to the destination (a shortest route or a preferred route selected by the passenger among candidate routes to the destination) may be transmitted as the above-described operating information to the driving integrated control unit 600 through the operating information input interface 101.

In some implementations, the control panel 120 may be implemented with a touchscreen that provides a User Interface (UI) for a driver to input or modify information for vehicle's autonomous driving control, and in this case, the driving mode switch 110 may be implemented with a touch button on the control panel 120.

In addition, the driving integrated control unit 600 may obtain driving information indicating a vehicle's driving state through the driving information input interface 201. The driving information may include a steering angle formed by a passenger's manipulation of a steering wheel, an accelerator pedal stroke or a brake pedal stroke formed by stepping on an accelerator or brake pedal, and various informations indicating vehicle's driving states and behaviors such as vehicle speed, acceleration, yaw, pitch, roll, and the like. As illustrated in FIG. 1, each driving information described above may be detected by a driving information detecting unit 200 including a steering angle sensor 210, an Accel Position Sensor/Pedal Travel Sensor (APS/PTS) 220, a vehicle speed sensor 230, an acceleration sensor 240, and a yaw/pitch/roll sensor 250.

Furthermore, the vehicle's driving information may include vehicle's location information that may be obtained by a Global Positioning System (GPS) receiver 260 applied to the vehicle. Such driving information is transmitted to the driving integrated control unit 600 through the driving information input interface 201 so as to be used to control the vehicle's driving in the autonomous or manual driving mode of the vehicle.

In addition, the driving integrated control unit 600 may transmit driving state information, which is provided to a passenger in the autonomous or manual driving mode of the vehicle, to an output unit 399 through the passenger output interface 301. Namely, the driving integrated control unit 600 transmits the driving state information of the vehicle to the output unit 300, thereby enabling the passenger to check an autonomous or manual driving state of the vehicle based on the driving state information outputted through the output unit 300. In this case, the driving state information may include various informations indicating vehicle's driving states such as a vehicle's current driving mode, vehicle's current transmission range, a vehicle's current speed and the like.

In addition, when it is determined that a driver needs a warning in the autonomous driving mode or the manual driving mode of the vehicle together with the driving state information described above, the driving integrated control unit 600 may transmit a warning information to the output unit 300 through the passenger output interface 301, thereby enabling the output unit 300 to output the warning to the driver. In order to audibly and visually output the driving state information and the warning information, the output unit 300 may include a speaker 310 and a display device 320 as shown in FIG. 1. In this case, the display device 320 may be implemented with the same device as the above-described control panel 120 or may be implemented with a separate independent device.

In addition, the driving integrated control unit 600 may transmit control information for controlling driving of the vehicle in the autonomous driving mode or the manual driving mode of the vehicle to a sub-control system 400 applied to the vehicle through the vehicle control output interface 401. As shown in FIG. 1, the sub-control system 400 for the driving control of the vehicle may include an engine control system 410, a braking control system 420, and a steering control system 430, and the driving integrated control unit 600 may transmit engine control information, braking control information, and steering control information as the control information to the sub-control systems 410, 420 and 430 through the vehicle control output interface 401, respectively. Accordingly, the engine control system 410 may control vehicle speed and acceleration of the vehicle by increasing or decreasing the fuel supplied to an engine, the braking control system 420 may control the vehicle braking by adjusting the braking force of the vehicle, and the steering control system 430 may control the steering of vehicle through a steering device (e.g., Motor Driven Power Steering (MDPS) system) applied to the vehicle.

As described above, the driving integrated control unit 600 of the present embodiment may obtain operating information according to a driver's manipulation and driving information indicating a driving state of the vehicle through the operating information input interface 101 and the driving information input interface 201, respectively, transmit driving state information and warning information generated according to autonomous driving algorithm to the output unit 300 through the passenger output interface 301, and transmits control information generated according to driving algorithm to the sub-control system 400 through the vehicle control output interface 401 so as to enable the driving control of the vehicle.

On the other hand, in order to ensure stable autonomous driving of the vehicle, it is necessary to continuously monitor a driving state by accurately measuring a driving environment of the vehicle and control the driving to meet the measured driving environment. To this end, as shown in FIG. 1, the vehicle according to the present embodiment may include a sensor unit 500 for detecting objects around the vehicle, such as a surrounding vehicle, a pedestrian, a road, or a fixed facility (e.g., a traffic light, a road sign, a traffic sign, a construction fence, etc.), and the like.

As shown in FIG. 1, the sensor unit 500 may include at least one of a lidar sensor 510, a radar sensor 520 and a camera sensor 530 to detect a surrounding object outside the vehicle.

The lidar sensor 510 may detect a surrounding object outside the vehicle by transmitting a laser signal around the vehicle and receiving a signal reflecting back from the corresponding object, and may detect a surrounding object located within a configured distance, a configured vertical view angle (Vertical Field of View), and a configured horizontal view angle (Horizontal Field of View), which are predefined according to the specifications. The lidar sensor 510 may include a front lidar sensor 511, a top lidar sensor 512 and a rear lidar sensor, installed on a front, side, a top side and a rear side of the vehicle, respectively, but the installation positions and the number of installations thereof are not limited to a specific embodiment. A threshold value for determining the validity of a laser signal reflecting back from the corresponding object may be previously stored in a memory (not shown) of the driving integrated control unit 600, and the driving integrated control unit 600 may determine a location (including a distance to the corresponding object), a speed and a movement direction of the corresponding object in a manner of measuring a time taken for the laser signal transmitted to return by reflecting back from the corresponding object through the lidar sensor 510.

The radar sensor 520 may detect a surrounding object outside the vehicle by emitting electromagnetic waves around the vehicle and receiving a signal reflecting back from the corresponding object, and may detect a surrounding object located within a configured distance, a configured vertical view angle, and a configured horizontal view angle, which are predefined according to the specifications. The radar sensor 520 may include a front radar sensor 521, a left radar sensor 521, a right radar sensor 522 and a rear radar sensor 523 respectively installed on the front, left, right, and rear sides of the vehicle, but the installation positions and number of installations thereof are not limited to a specific embodiment. The driving integrated control unit 600 may determine a location (including a distance to a corresponding object), a speed, and a movement direction of the corresponding object in a manner of analyzing power of the electromagnetic waves transmitted and received through the radar sensor 520.

The camera sensor 530 may detect a surrounding object outside the vehicle by photographing the surroundings of the vehicle, and may detect a surrounding object located within a configured distance, a configured Vertical Field of View, and a configured Horizontal Field of View, which are predefined according to the specifications. The vertical and horizontal view angles of the camera sensor 530 may be adjustable. That is, by adjusting the range of the angle of view, the range in which an object (e.g., a surrounding vehicle) is detected may be appropriately manipulated as necessary.

The camera sensor 530 may include a front camera sensor 531, a left camera sensor 532, a right camera sensor 533, and a rear camera sensor 534 respectively installed on the front, left, right, and rear sides of the vehicle, but the installation position and number of installations are not limited to a specific embodiment. The driving integrated control unit may determine a location (including a distance to a corresponding object), a speed, a moving direction, and the like of the corresponding object by applying predefined image processing to an image photographed through the camera sensor 530.

In addition, an internal camera sensor 535 for photographing the inside of the vehicle may be mounted at a predetermined position (e.g., a rear view mirror), and the driving integrated control unit 600 may monitor the behavior and state of a passenger based on the image obtained through the internal camera sensor 535 and output guidance or warning to the passenger through the aforementioned output unit 300.

In addition to the lidar sensor 510, the radar sensor 520, and the camera sensor 530, the sensor unit 500 may further include an ultrasonic sensor 540 as shown in FIG. 1, and various types of sensors for detecting objects around the vehicle may be further employed in the sensor unit 500.

To help the understanding of the present embodiment, FIG. 2 illustrates that the front lidar sensor 511 or the front radar sensor 521 is installed on the front side of the vehicle, the rear lidar sensor 513 or the rear radar sensor 524 is installed on the rear side of the vehicle, and the front camera sensor 531, the left camera sensor 532, the right camera sensor 533, and the rear camera sensor 534 are installed on the front, left, right, and rear sides of the vehicle, respectively, but the installation positions and number of the sensors are not limited to a specific embodiment, as described above.

Furthermore, the sensor unit 500 may further include biometric sensors to detect passenger's biometric signals (e.g., heart rate, ECG, respiration, blood pressure, body temperature, brain waves, blood flow (pulse wave), blood glucose, etc.) to determine the condition of the passenger in the vehicle. The biometric sensors may include a heart rate sensor, an electrocardiogram sensor, a respiratory sensor, a blood pressure sensor, a body temperature sensor, an electroencephalogram sensor, a photoplethysmography sensor, a blood glucose sensor, etc.

Finally, the sensor unit 500 additionally includes a microphone 550, and an internal microphone 551 and an external microphone 552 are used for different purposes, respectively.

The internal microphone 551 may be used, for example, to analyze the voice of a passenger aboard the autonomous vehicle 1000 based on AI or to immediately respond to a direct voice command.

On the other hand, the external microphone 552 may be used for appropriately responding to safe driving and the like by analyzing various sounds generated outside the autonomous vehicle 1000 using various analysis tools such as deep learning and the like.

For reference, the reference numbers shown in FIG. 2 may perform the same or similar functions as the reference numbers shown in FIG. 1, and FIG. 2 more specifically illustrates a relative position relationship (based on the inside of the autonomous vehicle 1000) of the respective components as compared with FIG. 1.

Figure 3:
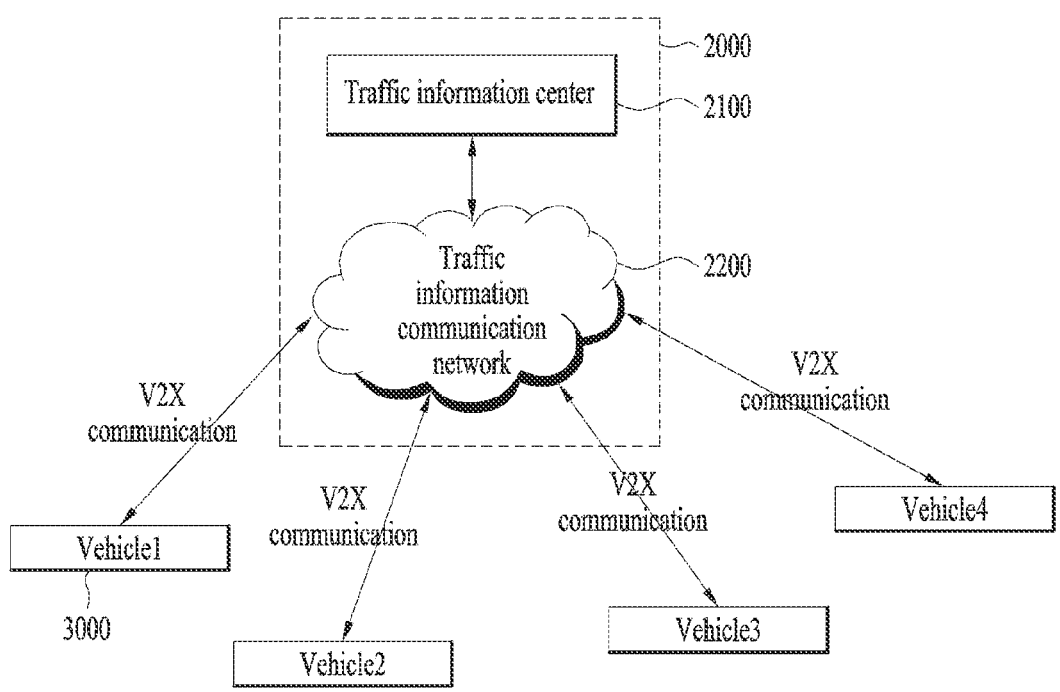
FIG. 3 shows a data communication system according to one of embodiments of the present disclosure.

FIG. 3 shows a data communication system according to one of embodiments of the present disclosure (hereinafter, a data communication system). A data communication system includes a vehicle 3000 having a camera sensor and a traffic control system 2000 connected to the vehicle 3000 via communication network.

The vehicle 3000 illustrated in FIG. 3 may correspond to the vehicle 1000 described in FIG. 1 and FIG. 2. In addition, the camera sensor provided in the vehicle 3000 may correspond to the camera sensor 530 described in FIG. 1 and FIG. 2, and may include a front camera sensor 531, a left camera sensor 532, a right camera sensor 533, a rear camera sensor 534, and/or an internal camera sensor 535 depending on its installation position.

The traffic control system 2000 illustrated in FIG. 3 may include a traffic information center 2100 and a traffic information communication network 2200. The traffic control system 2000 is a system built for signal control, traffic information collection, traffic information provision, operation management and the like, and may include a traffic information center 2100 for storing and processing traffic related information and a traffic information communication network 2200 transmitting and receiving traffic related information. The traffic information center 2100 and the vehicle 3000 may transmit and receive data through V2X-based communication via the traffic information communication network 2200.

In this specification, the traffic control system 2000 may be referred to as a "server" having a comprehensive meaning. A server of a comprehensive meaning is a computer system that provides information or services to a client through a network, and may refer to a computer program or device. That is, a server according to embodiments of the present disclosure may mean a computer system for transmitting and receiving various data based on V2X-based communication with the vehicle 3000.

Meanwhile, the vehicle 3000 may transmit data collected from various sensors provided in the vehicle 3000 to the traffic control system 2000 or receive data from the traffic control system 2000. Data transmission and reception may be performed in real time during a driving period of the vehicle 3000, or may be performed by mutual information requests if necessary. The vehicle 3000 may not only communicate data with the traffic control system 2000 based on the V2X, but may also communicate data with other vehicles. In addition, the number of vehicles 3000 according to the present embodiment is not limited, and the data communication system according to the present embodiment enables information to be transmitted and received between multiple vehicles and the traffic control system 2000 through mutual communication.

Figure 4:
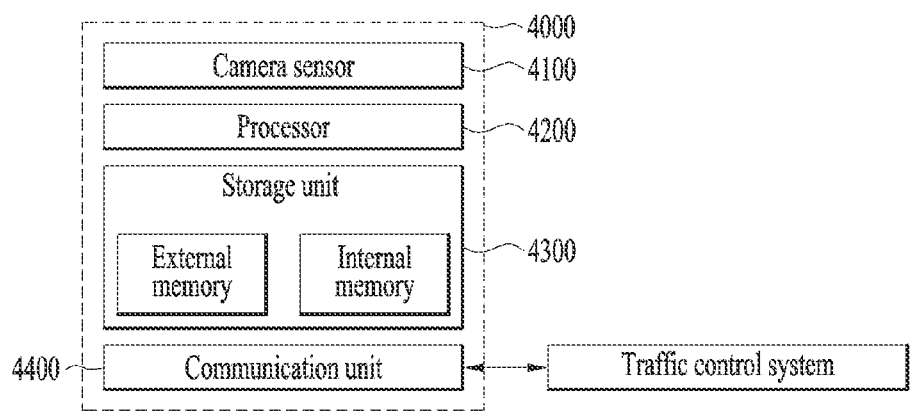
FIG. 4 is a block diagram of a vehicle system to which a data communication system according to one of embodiments of the present disclosure is applicable.

FIG. 4 is a block diagram of a vehicle system to which a data communication system according to one of embodiments of the present disclosure is applicable. A vehicle 4000 includes a camera sensor 4100, a processor 4200, a storage unit 4300 and a communication unit 4400.

The vehicle 4000 shown in FIG. 4 may correspond to the vehicle 1000 described in FIG. 1 and FIG. 2 and the vehicle 3000 described in FIG. 3. In addition, the camera sensor 4100 shown in FIG. 4 may correspond to the camera sensor 530 described in FIG. 1 and FIG. 2, and may include a front camera sensor 531, a left camera sensor 532, a right camera sensor 533, a rear camera sensor 534, and/or an internal camera sensor 535 depending on its installation position.

The camera sensor 4100 captures a photographed image. The camera sensor 4100 may include a camera lens, and a CCD or CMOS sensor to capture an image photographed through the camera lens and transmit the captured image according to a data transmission standard.

The processor 4200 is configured to correspond to the autonomous driving integrated control unit 600 of FIG. 1, and extracts vehicle identification information based on image data photographed by the camera sensor 4100. The vehicle identification information is unique information capable of identifying a specific vehicle and may include information consisting of characters or numbers written on a license plate of the specific vehicle. That is, the processor 4200 may extract vehicle identification information by recognizing the license plate of the vehicle photographed by the camera sensor 4100.

In more detail, the processor 4200 may recognize the license plate and the vehicle number (vehicle identification information) through a license plate recognition module and a text recognition module. The license plate recognition module may recognize a license plate area of a specific vehicle from an image photographed by the camera sensor 4100, and the text recognition module may recognize a text positioned in the license plate area and extract it as data. The license plate and text recognition process may improve recognition accuracy through data learning using machine learning or deep learning Artificial Intelligence (AI) algorithms.

In addition, the processor 4200 may generate information related to the accuracy of vehicle identification information by calculating the text recognition accuracy. For example, the text recognition accuracy is expressed in the range of 0% to 100% as the recognition accuracy of the text recognized by the processor 4200, and the accuracy may be calculated for each text.

The storage unit 4300 may be configured as a memory for storing various types of data, programs, and the like. The memory is a volatile memory and/or a nonvolatile memory, and may consist of DRAM, NAND flash, NOR flash, SD card memory, and the like, and may store a license plate recognition module program and a text recognition module program.

In addition, the storage unit 4300 may store vehicle identification information, text recognition accuracy, and information acquired from various sensors provided in the vehicle. For example, for specific vehicle identification information, various related information may be stored together, including time information on a vehicle identification information acquired time, vehicle location information upon acquiring vehicle identification information, vehicle driving direction upon acquiring vehicle identification information, driving road information (name, length) upon acquiring vehicle identification information, etc. In addition, the storage unit 4300 may store vehicle identification information and informations related thereto for a predetermined period of time, or may store a predetermined amount of latest information while maintaining a preset storage capacity.

The communication unit 4400 is configured to transmit and receive data between the vehicle 4000 and the traffic control system through V2X-based communication, and the vehicle 4000 may transmit and receive various informations to and from the traffic control system through the communication unit 4400.

Figure 5:
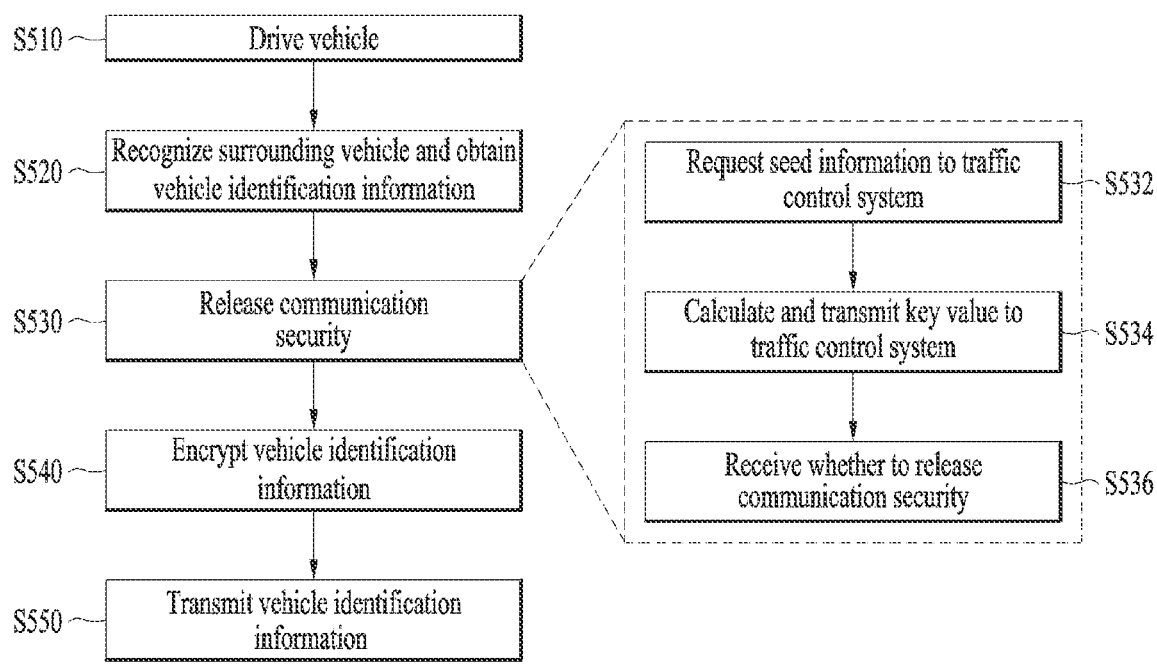
FIG. 5 is a flowchart showing a process for transmitting vehicle identification information in a data communication system according to one of embodiments of the present disclosure.

FIG. 5 is a flowchart showing a process for transmitting vehicle identification information in a data communication system according to one of embodiments of the present disclosure. That is, a method of communicating vehicle identification information between a vehicle and a traffic control system is illustrated.

First, when a vehicle starts driving (S510), a camera sensor of the vehicle is operated to recognize a surrounding vehicle and obtain vehicle identification information of the recognized vehicle (S520). The vehicle identification information may be obtained through a license plate and text recognition process with an image photographed by the camera sensor built in the vehicle, and the process may be performed by the processor 4200 described in FIG. 4.

Subsequently, the vehicle performs a process of releasing communication security to transmit the vehicle identification information to a traffic control system (S530). In the process of releasing communication security, seed information is requested from the vehicle to the traffic control system (S532), and a key value is calculated based on the seed information received from the traffic control system according to the request and transmitted to the traffic control system (S534). The key value may be calculated from the received seed information using a predetermined algorithm in the camera sensor or the processor of the vehicle. In addition, the process of requesting and receiving the seed information and the process of transmitting the key value may be performed by a communication unit of the vehicle.

After transmitting the key value, the traffic control system verifies whether the key value received from the vehicle is valid and transmits whether communication security is released to the vehicle, and the vehicle receives whether the communication security is released (S536). Then, when the communication security is released, the vehicle encrypts vehicle identification information (S540), and transmits the vehicle identification information to the traffic control system (S550). Encryption of the vehicle identification information may be performed by the processor using various known algorithms based on the V2X communication security standard specification. The above-described communication security release process may utilize the security access 27 hex of the UDS specification (ES95486-02/00)

Figure 6:
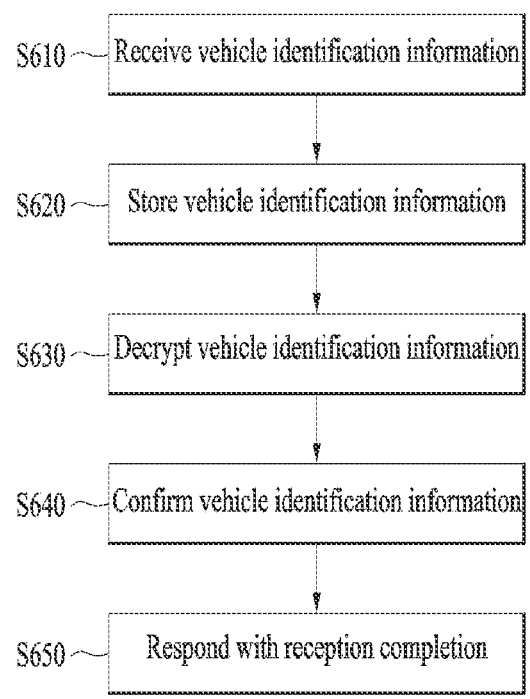
FIG. 6 is a flowchart showing a process for receiving vehicle identification information in a data communication system according to one of embodiments of the present disclosure.

FIG. 6 is a flowchart showing a process for receiving vehicle identification information in a data communication system according to one of embodiments of the present disclosure. Namely, after the vehicle transmits vehicle identification information to the traffic control system, a process of receiving the vehicle identification information by the traffic control system is illustrated. The traffic control system receives the vehicle identification information from the vehicle (S610) and stores the received vehicle identification information (S620). Then, the encrypted vehicle identification information is decrypted (S630), and the vehicle identification information is checked (S640), and data reception completion is responded to the vehicle (S650).

Figure 7:
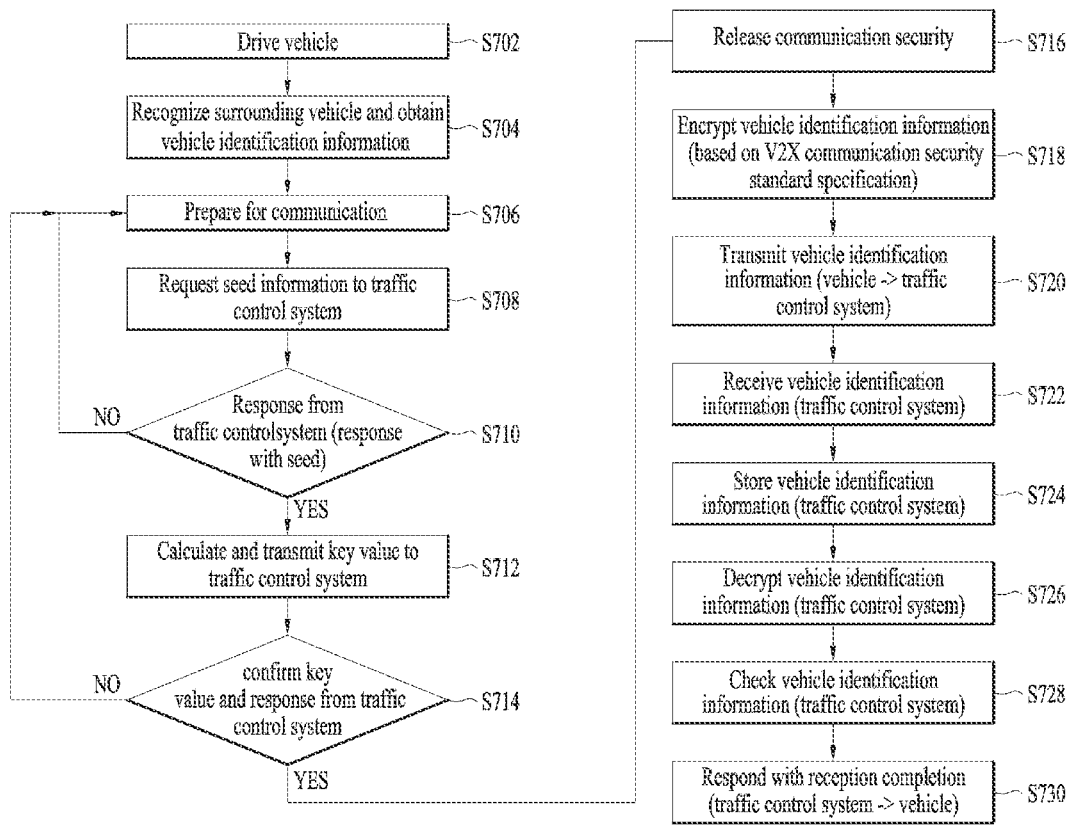
FIG. 7 is a flowchart showing a process for transmitting and receiving vehicle identification information in a data communication system according to one of embodiments of the present disclosure.

FIG. 7 is a flowchart showing a process for transmitting and receiving vehicle identification information in a data communication system according to one of embodiments of the present disclosure. FIG. 7 may be understood as an integrated view of the transmission process of FIG. 5 and the reception process of FIG. 6. The process corresponding to S722 to S730 in FIG. 7 corresponds to the process corresponding to S610 to S650 in FIG. 6.

In addition, the contents of the communication preparation step S706 to the communication security release step S716 of FIG. 7 specify the communication security release step S530 in FIG. 5. Hereinafter, the vehicle requests seed information to the traffic control system (S708), and the traffic control system determines the requested content and responds to the vehicle (S710).

When the response result is YES, the traffic control system transmits seed information to the vehicle, and the vehicle calculates a key value based on the received seed information and transmits the calculated key value to the traffic control system (S712). The traffic control system checks the received key value and responds to the vehicle (S714). When the key value is valid, communication security is released (S716), and the vehicle may transmit data to the traffic control system.

In this case, if the response of the traffic control system is NO because the seed request or the transmitted key value of the vehicle is not valid, the vehicle may return to the communication preparation step S706 and request seed information to the traffic control system again.

The system according to the present embodiment transmits vehicle identification information to the traffic control system in real time simultaneously with the vehicle driving. Accordingly, the traffic control system may collect vehicle identification information data recognized by a camera sensor of the driving vehicle, track and search a specific vehicle based on the collected information, or provide information related to a surrounding vehicle to a driver.

Figure 8:
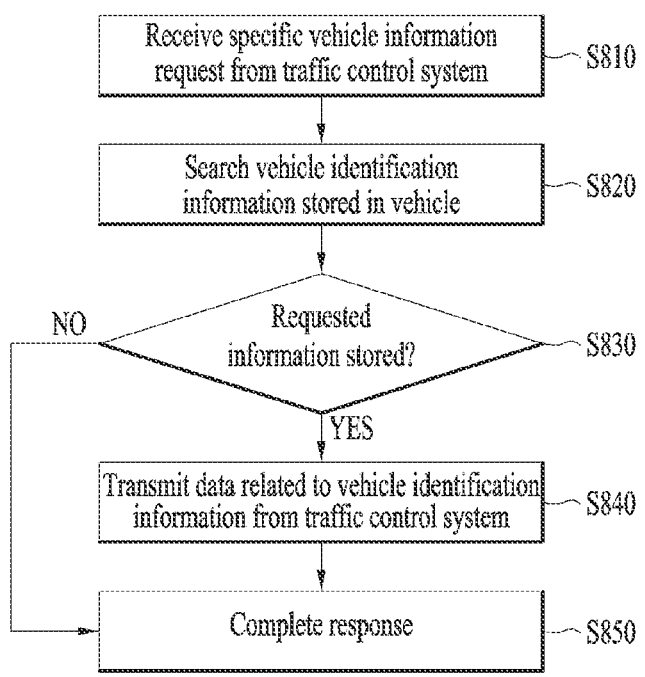
FIG. 8 is a flowchart showing a process for transmitting and receiving vehicle identification information in a data communication system according to one of embodiments of the present disclosure.

FIG. 8 shows a process for performing communication of data related to vehicle identification information by a vehicle as a system according to one of embodiments of the present disclosure in response to a request from a traffic control system.

A vehicle may receive an information request for a specific vehicle from a traffic control system (S810). For example, the traffic control system may request information related to the specific vehicle by transmitting vehicle identification information (e.g., vehicle number) of the specific vehicle to the vehicle. The vehicle receiving the vehicle identification information may search whether the corresponding vehicle identification information is stored in a storage unit (memory) (S820). Then, it is determined whether the vehicle identification information and related information are stored (S830). When the vehicle identification information and the related information are stored in the storage unit, the vehicle transmits the vehicle identification information and the related information to the traffic control system (S840), and transmits response completion (S850). If the informations are not stored, the response completion is immediately transmitted (S850).

Here, the information related to the vehicle identification information may include a time and a location at which the corresponding vehicle identification information is obtained from the vehicle, a driving direction of the vehicle, driving road information (name, length), and the like. Accordingly, the traffic control system may collect information on a sighting location, a sighting time, a driving direction, a speed, etc. of the specific vehicle through the vehicle identification information, and may easily track the specific vehicle.

Although not shown in FIG. 8, a communication security release process and an encryption or decryption process may be applied to the system according to the present embodiment like the system of FIG. 7.

Figure 9:
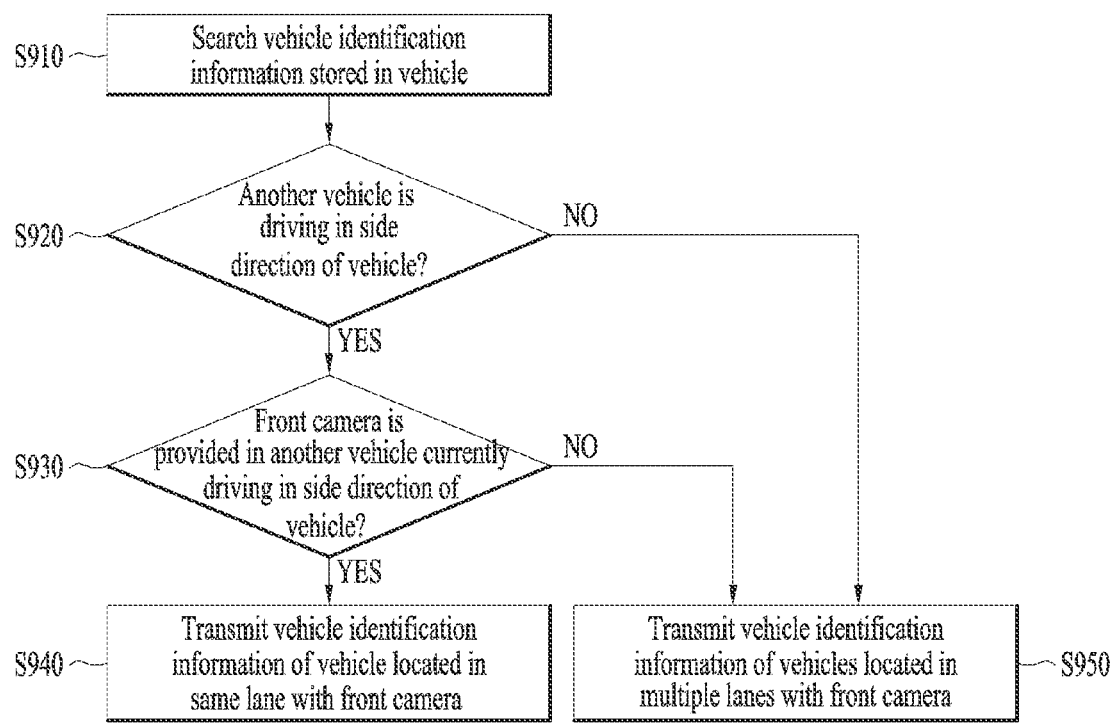
FIG. 9 is a flowchart showing a process for obtaining vehicle identification information in a data communication system according to one of embodiments of the present disclosure.

FIG. 9 shows a process for obtaining vehicle identification information in a data communication system according to one of embodiments of the present disclosure. In the present embodiment, a vehicle includes a front camera sensor for photographing a front side of the vehicle and a side (left or right) camera sensor for photographing a side of the vehicle. The camera sensors may adjust a photographing range or a capturing range of an image by adjusting an angle of view.

In a system according to the present embodiment, a process of obtaining vehicle identification information may adjust the angle of view of a camera sensor in consideration of whether another vehicle is driving on a side of the vehicle. In more detail, whether another vehicle is driving on the side of the vehicle (first condition) is checked (S920). When another vehicle is driving on the side of the vehicle, whether another vehicle includes a front camera sensor (second condition) is checked (S930).

When another vehicle includes the front camera sensor, the vehicle acquires only vehicle identification information of another vehicle traveling in the same lane by adjusting the angle of view of the front camera sensor, and transmits the vehicle identification information to the traffic control system (S940). When another vehicle does not include the front camera sensor, the vehicle acquires vehicle identification information on a plurality of other vehicles traveling in a plurality of lanes by adjusting the angle of view of the front camera sensor, and transmits the vehicle identification information to the traffic control system (S950).

That is, when both the first condition and the second condition are YES, the vehicle acquires only vehicle identification information of another vehicle having the front camera sensor positioned in the same lane. When any one of the first condition and the second condition is NO, the front camera sensor may obtain vehicle identification information of other vehicles traveling in at least two lanes by adjusting an angle of view.

According to the present embodiment, since redundant data generated when a plurality of vehicles acquire vehicle identification information is removed, efficient data communication is possible. In the present embodiment, when another vehicle located at the side acquires vehicle identification information through a front camera sensor, a vehicle does not acquire the same information as the vehicle located at the side by obtaining only vehicle identification information of another vehicle located in the same lane as the lane in which the vehicle is travelling.

Meanwhile, a data communication vehicle according to the present embodiment includes a camera sensor 4100, a processor 4200 for extracting vehicle identification information from an image photographed by the camera sensor, and a communication unit 4400 for transmitting and receiving data to and from a server based on V2X. In addition, the data communication vehicle may further include a storage unit 4300 capable of storing vehicle identification information. The camera sensor 4100 corresponds to the camera sensor 530 of FIG. 1, and may adjust the angle of view according to a control command of the control unit 600. Accordingly, as described in FIG. 9, the data communication vehicle may photograph a single lane or a plurality of lanes by adjusting an angle of view of the camera sensor according to a specific condition.

In another aspect of the present disclosure, the above-described proposal or operation of the present disclosure may be provided as codes that may be implemented, embodied or executed by a "computer" (a comprehensive concept including a system on chip (SoC) or a microprocessor), an application storing or containing the codes, a computer-readable storage medium, a computer program product, and the like, which also comes within the scope of the present disclosure.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Therefore, the present disclosure is not intended to be limited to the embodiments shown herein, but to give the broadest scope that matches the principles and novel features disclosed herein.

What is claimed is:

1. A system for data communication, comprising:
a vehicle having a camera sensor comprising a front camera sensor photographing a view in a front direction of the vehicle and a side camera sensor photographing a view in a side direction of the vehicle; and
a server transmitting and receiving data to and from the vehicle,
wherein the vehicle comprises a processor extracting vehicle identification information from an image captured by the camera sensor,
wherein the vehicle transmits the vehicle identification information to the server, and
wherein the processor checks whether a different vehicle is traveling on a side of the vehicle, checks whether the different vehicle has a front camera sensor based on the different vehicle currently travelling on the side of the vehicle, obtains vehicle identification information of another vehicle located in a same lane of the vehicle with the front camera sensor of the vehicle if the different vehicle has the front camera sensor, and obtains respective pieces of vehicle identification information of other vehicles located in at least two lanes with the front camera sensor of the vehicle if the different vehicle does not have the front camera sensor.

2. The system of claim 1, wherein the vehicle further comprises a communication unit for transmitting and receiving the data to and from the server, and
wherein the communication unit communicates with the server based on V2X.

3. The system of claim 2, wherein the vehicle further comprises a storage for storing the vehicle identification information.

4. The system of claim 1,
wherein the camera sensor adjusts a view angle.

5. A method for data communication, the method comprising:
obtaining vehicle identification information from an image captured by a camera sensor of a vehicle;
releasing security of a server by a communication unit of the vehicle to communicate with the server based on V2X; and
transmitting the vehicle identification information to the server from the communication unit,
wherein the obtaining the vehicle identification information comprises:
checking whether a different vehicle is traveling on a side of the vehicle;
checking whether the different vehicle has a front camera sensor based on the different vehicle currently travelling on the side of the vehicle;
obtaining vehicle identification information of another vehicle located in a same lane of the vehicle with the front camera sensor of the vehicle if the different vehicle has the front camera sensor; and
obtaining respective pieces of vehicle identification information of other vehicles located in at least two lanes with the front camera sensor of the vehicle if the different vehicle does not have the front camera sensor.

6. The method of claim 5, wherein the releasing the security comprises:
requesting seed information from the communication unit to the server; and
transmitting a key value from the communication unit to the server.

7. The method of claim 5, wherein the transmitting the vehicle identification information to the server comprises encrypting the vehicle identification information.

8. The method of claim 5, further comprising:
receiving the vehicle identification information in the server;
storing the vehicle identification information in the server; and
decrypting the vehicle identification information in the server.

9. The method of claim 5, further comprising:
receiving, by the vehicle, the vehicle identification information on a specific vehicle from a server;
checking, by the vehicle, whether the vehicle identification information of the specific vehicle is stored in a storage; and
transmitting, by the vehicle, the vehicle identification information on the specific vehicle and information related to the vehicle identification information to the server in response to a result checked in the checking step.

10. The method of claim 9, wherein the transmitting comprises encrypting the vehicle identification information and the information related to the vehicle identification information.

11. The method of claim 5, wherein the obtaining the vehicle identification information comprises adjusting the view angle of the camera sensor in consideration of whether the different vehicle is travelling on the side of the vehicle.

\* \* \* \* \*